US010466972B2

(12) United States Patent
Miyamoto et al.

(10) Patent No.: US 10,466,972 B2
(45) Date of Patent: Nov. 5, 2019

(54) AUTOMATIC PROGRAM GENERATION SYSTEM AND AUTOMATIC PROGRAM GENERATION METHOD

(71) Applicant: HITACHI, LTD., Tokyo (JP)

(72) Inventors: Atsushi Miyamoto, Tokyo (JP); Tadayuki Matsumura, Tokyo (JP); Norio Ohkubo, Tokyo (JP); Ryuji Mine, Tokyo (JP)

(73) Assignee: HITACHI LTD., Tokyo (JP)

( * ) Notice: Subject to any disclaimer, the term of this patent is extended or adjusted under 35 U.S.C. 154(b) by 0 days.

(21) Appl. No.: 15/898,731

(22) Filed: Feb. 19, 2018

(65) Prior Publication Data
US 2018/0239593 A1    Aug. 23, 2018

(30) Foreign Application Priority Data

Feb. 22, 2017    (JP) .................................. 2017-030940

(51) Int. Cl.
*G06F 9/44*    (2018.01)
*G06F 9/445*   (2018.01)
(Continued)

(52) U.S. Cl.
CPC ................. *G06F 8/30* (2013.01); *G06F 8/75* (2013.01); *G06N 3/126* (2013.01); *G06F 8/10* (2013.01); *G06F 8/42* (2013.01)

(58) Field of Classification Search
CPC ..... G06F 8/30; G06F 8/75; G06F 8/10; G06F 8/42; G06N 3/126
See application file for complete search history.

(56) References Cited

U.S. PATENT DOCUMENTS 6,532,453 B1 *  3/2003  Koza ...................... G06N 3/126
                                                      706/13
7,577,935 B2 *  8/2009  Reynolds ................ G06F 8/30
                                                      717/106
(Continued)

FOREIGN PATENT DOCUMENTS

JP    2015-230702 A    12/2015

OTHER PUBLICATIONS

David R. White, Evolutionary Improvement of Programs, 2011, pp. 515-536 https://ieeexplore.ieee.org/stamp/stamp.jsp?tp=&arnumber=5688317 (Year: 2011).*

(Continued)

*Primary Examiner* — Mongbao Nguyen
(74) *Attorney, Agent, or Firm* — Volpe and Koenig, P.C.

(57) ABSTRACT

An automatic program generation system that includes: an input unit that receives inputs of input data, target data, and design requirements for a first program to be generated; a program storage unit that stores a plurality of existing second programs; a program generation device that generates the first program; and an output unit that outputs the first program. The program generation device includes a program analysis unit that analyzes the plurality of second programs to generate a program model, a basic node/constraint generation unit that generates basic nodes and constraints for evolutionary computation based on the generated program model and the design requirements input from the input unit, and an optimization unit that generates the first program by the evolutionary computation based on the basic nodes and the constraints and the input data and the target data input from the input unit.

14 Claims, 19 Drawing Sheets

(51) Int. Cl.
*G06F 8/30* (2018.01)
*G06N 3/12* (2006.01)
*G06F 8/75* (2018.01)
*G06F 8/10* (2018.01)
*G06F 8/41* (2018.01)

(56) References Cited

U.S. PATENT DOCUMENTS

| | | | | |
|---|---|---|---|---|
| 9,009,536 | B2* | 4/2015 | Dancy | G06F 11/3684 714/38.1 |
| 10,325,674 | B2* | 6/2019 | Yasuda | G16B 10/00 |
| 2004/0083458 | A1* | 4/2004 | Gschwind | G06F 11/362 717/129 |
| 2008/0307399 | A1* | 12/2008 | Zhou | G06N 3/126 717/141 |
| 2010/0100867 | A1* | 4/2010 | Sindhgatta | G06F 8/75 717/105 |
| 2012/0036096 | A1* | 2/2012 | Omar | G06N 3/126 706/14 |
| 2012/0225628 | A1* | 9/2012 | Ho | G06N 3/126 455/115.1 |
| 2012/0311564 | A1* | 12/2012 | Khalid | G06F 8/61 718/1 |
| 2013/0006901 | A1* | 1/2013 | Cantin | G06N 20/00 706/13 |
| 2013/0073490 | A1* | 3/2013 | Baughman | G06N 3/126 706/13 |
| 2013/0263091 | A1* | 10/2013 | Neogi | G06F 9/5061 717/126 |
| 2014/0236577 | A1* | 8/2014 | Malon | G06F 17/28 704/9 |
| 2014/0279765 | A1* | 9/2014 | Cantin | G06N 3/126 706/13 |
| 2014/0282444 | A1* | 9/2014 | Araya | G06F 8/42 717/143 |
| 2015/0067644 | A1* | 3/2015 | Chakraborty | G06F 8/75 717/123 |
| 2015/0169295 | A1* | 6/2015 | Kyoso | G06F 8/34 717/109 |
| 2016/0083507 | A1* | 3/2016 | Tokushige | C08G 63/06 528/354 |
| 2016/0224453 | A1* | 8/2016 | Wang | G06F 11/3604 |
| 2016/0379088 | A1* | 12/2016 | Nagato | G06K 9/6217 382/219 |
| 2017/0053204 | A1* | 2/2017 | Okamoto | G06F 11/36 |
| 2017/0083507 | A1* | 3/2017 | Ho | G06F 16/9535 |
| 2018/0024832 | A1* | 1/2018 | Dang | G06F 8/74 717/104 |
| 2018/0137390 | A1* | 5/2018 | Brundage | G06K 9/00624 |
| 2018/0144249 | A1* | 5/2018 | Nagato | G06F 9/44 |
| 2018/0218263 | A1* | 8/2018 | Okamato | G06T 1/20 |
| 2018/0225125 | A1* | 8/2018 | Okamoto | G06K 9/00664 |
| 2019/0196934 | A1* | 6/2019 | Sisman | G06F 11/362 |

OTHER PUBLICATIONS

Westley Weimer, Automatic Program Repair with Evolutionary Computation, 2010, pp. 109-116. https://web.eecs.umich.edu/~weimerw/p/p109-weimer.pdf (Year: 2010).*

Masood Zamani, Protein Secondary Structure Prediction Using an Evolutionary Computation Method and Clustering, 2015, pp. 1 -6. https://ieeexplore.ieee.org/stamp/stamp.jsp?tp=&arnunnber=7300327 (Year: 2015).*

Biaobiao Zhang, Evolutionary Computation and Its Applications in Neural and Fuzzy Systems, 2011, pp. 1-20. https://www.hindawi.com/journals/acisc/2011/938240/ (Year: 2011).*

Nailah Al-Madi, Adaptive Genetic Programming applied to Classification in Data Mining, 2012, pp. 79-85. https://ieeexplore.ieee.org/stamp/stamp.jsp?tp=&arnumber=6402243 (Year: 2012).*

Junji Otsuka, An Improvement in Classification Accuracy of Fuzzy Oriented Classifier Evolution, 2013, pp. 3921-3926. https://ieeexplore.ieee.org/stamp/stamp.jsp?tp=&arnumber=6722422 (Year: 2013).*

Gerald Schaefer, Evolutionary Optimisation of Classifiers and Classifier Ensembles for Cost-Sensitive Pattern Recognition, 2013, pp. 343-345. https://ieeexplore.ieee.org/stamp/stamp.jsp?tp=&arnumber=6608995 (Year: 2010).*

Fuuki Horii, Improvement of the Success Rate of Automatic Generation of Procedural Programs with Variable Initialization Using Genetic Programming, 2014, pp. 699-704. https://ieeexplore.ieee.org/stamp/stamp.jsp?tp=&arnumber=6913388 (Year: 2014).*

Admir Barolli, Effects of Mutation and Crossover in Genetic Algorithms for Node Placement in WMNs Considering Giant Component Parameter, 2011, pp. 18-25. https://ieeexplore.ieee.org/stamp/stamp.jsp?tp=&arnumber=6103010 (Year: 2011).*

Harshit Bhardwaj, A Novel Genetic Programming Approach to Control Bloat Using Crossover and Mutation With Intelligence Technique, 2015, pp. 1-6. https://ieeexplore.ieee.org/stamp/stamp.jsp?tp=&arnumber=7375619 (Year: 2015).*

* cited by examiner

FIG. 4
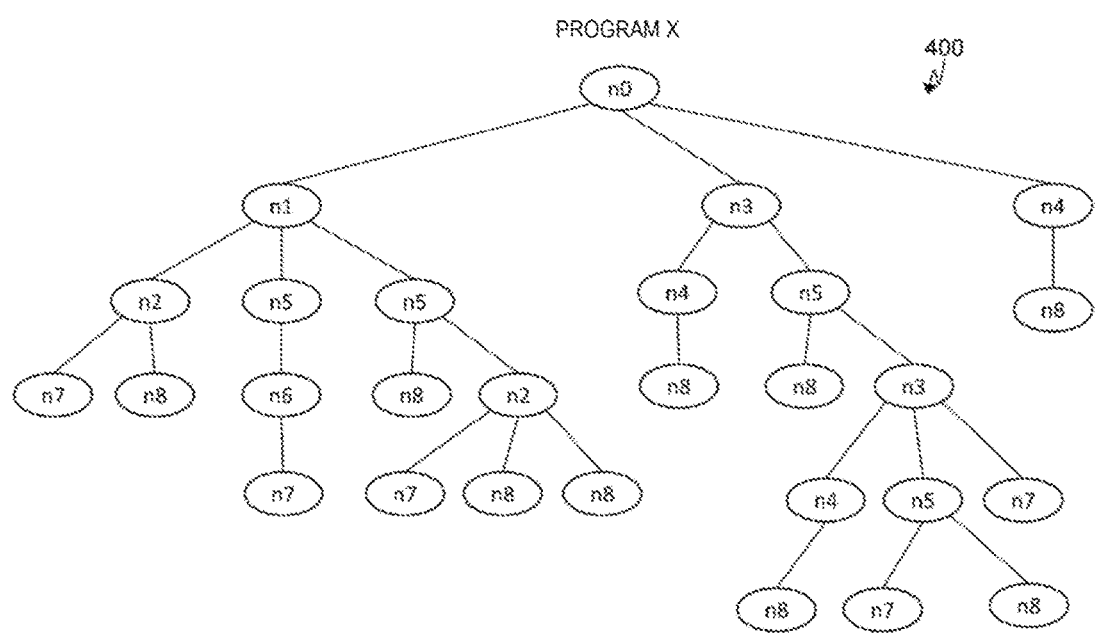
PROGRAM X
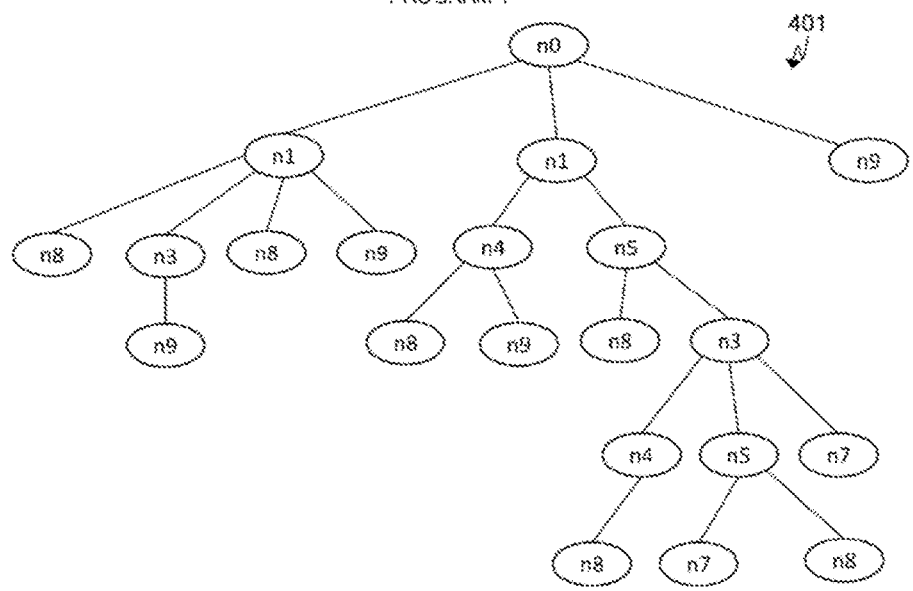
PROGRAM Y

*FIG. 5*

| NODE | MEANING |
|---|---|
| AddR0 a0 | R0 += a0, R0 ⇒ r |
| AddR1 a0 | R1 += a0, R1 ⇒ r |
| AddR2 a0 | R2 += a0, R2 ⇒ r |
| AddR3 a0 | R3 += a0, R3 ⇒ r |
| Process a0 a1 | a0, a1 ⇒ r |
| IfThenElse a0 a1 a2 a3 | if(a0 == a1) then a2 ⇒ r else a3 ⇒ r |

| NODE | MEANING |
|---|---|
| MulR0 a0 | R0 *= a0, R0 ⇒ r |
| MulR1 a0 | R1 *= a0, R1 ⇒ r |
| MulR2 a0 | R2 *= a0, R2 ⇒ r |
| MulR3 a0 | R3 *= a0, R3 ⇒ r |

| NODE | MEANING |
|---|---|
| Data0 | D0 ⇒ r |
| Data1 | D1 ⇒ r |
| Const0 | 0 ⇒ r |
| Const1 | 1 ⇒ r |

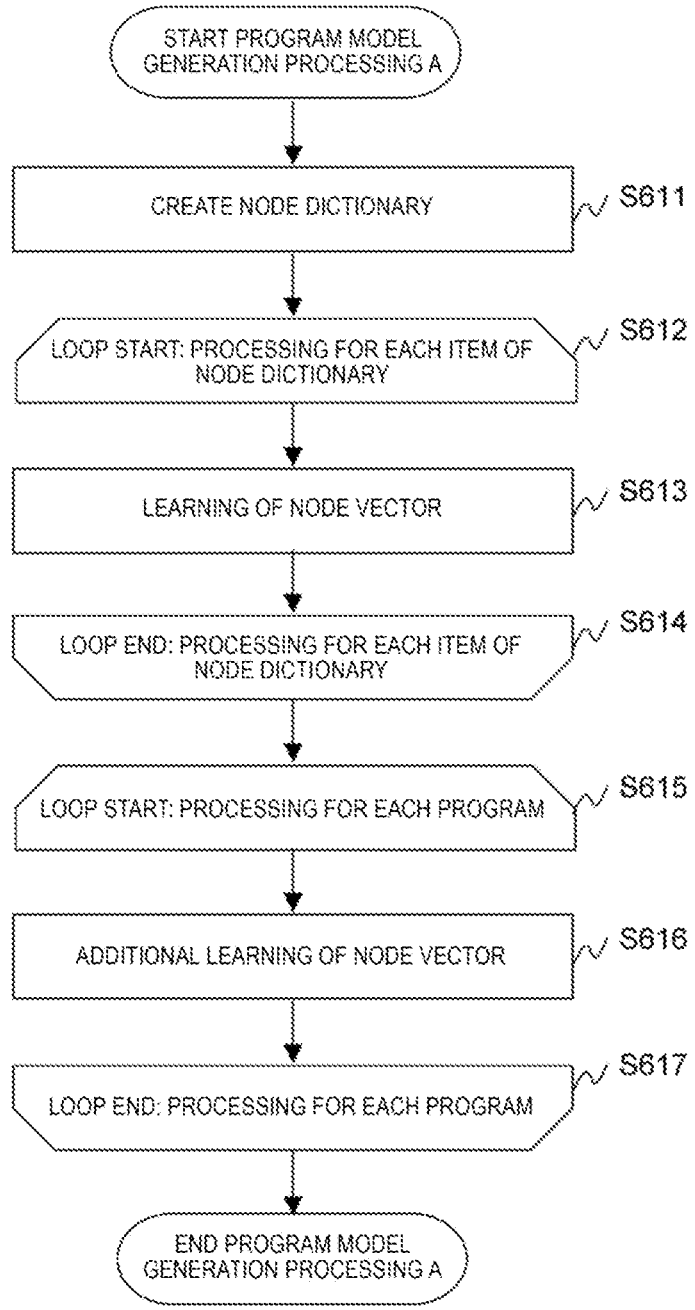

FIG. 7A

| DICTIONARY ITEM |
|---|
| n0 |
| n1 |
| n2 |
| n3 |
| n4 |
| n5 |
| n6 |
| n7 |
| n8 |
| n9 |

FIG. 7B

| DICTIONARY ITEM | NODE VECTOR |
|---|---|
| n0 | 2.4, 1.2, 7.5 ... |
| n1 | 7.0, 2.0, 1.0 ... |
| n2 | 5.4, 6.8, 0.1... |
| n3 | 9.1, 7.4, 9.8... |
| n4 | 8.8, 5.1, 6.2... |
| n5 | 8.0, 6.1, 1.1... |
| n6 | 7.7, 5.4, 1.1... |
| n7 | 4.4, 1.0, 5.9... |
| n8 | 7.9, 4.0, 3.3... |
| n9 | 1.9, 1.5, 7.9... |

OVERLAPPING PROGRAM

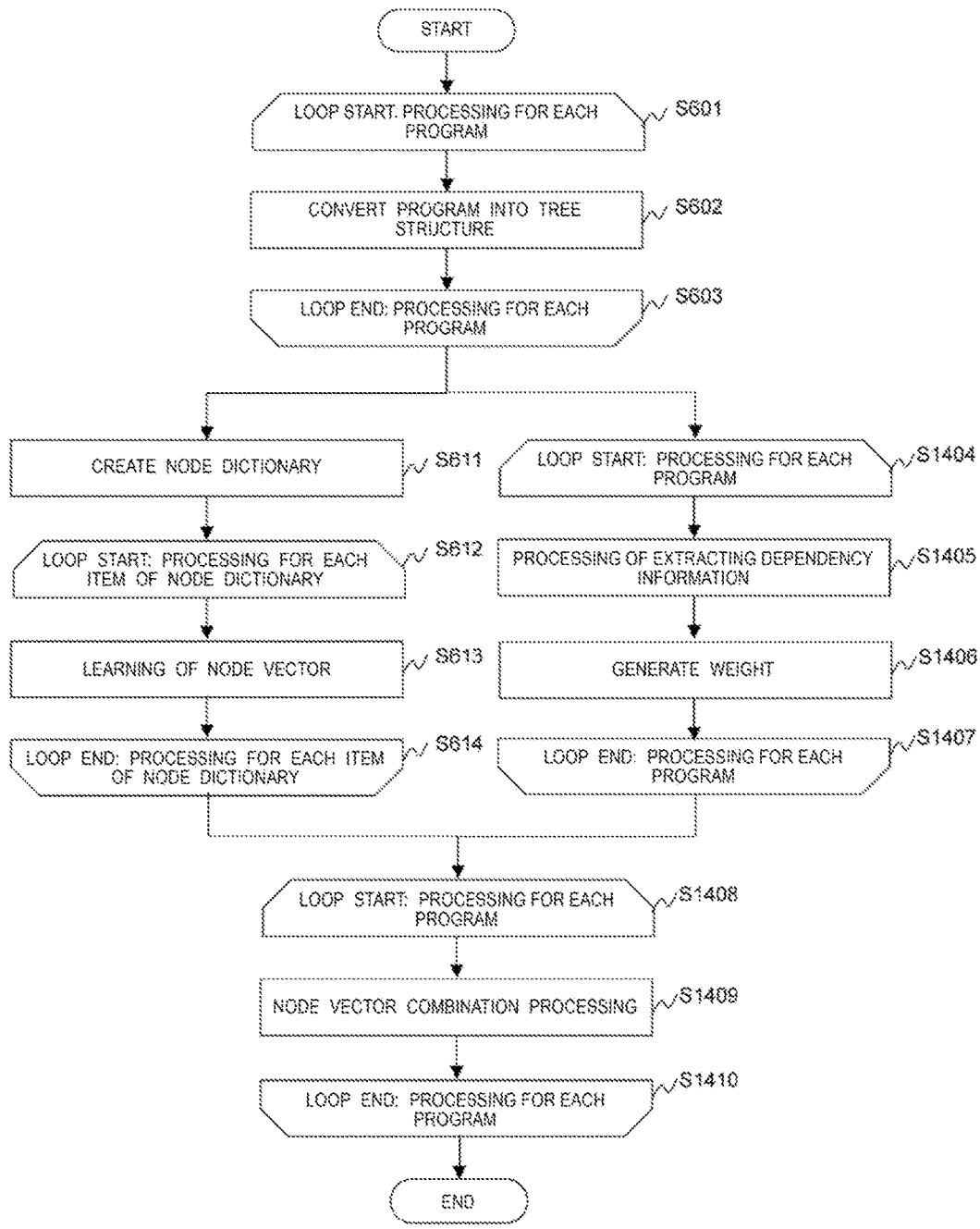

AUTOMATIC PROGRAM GENERATION SYSTEM AND AUTOMATIC PROGRAM GENERATION METHOD

CLAIM OF PRIORITY

The present application claims priority from Japanese application JP 2017-030940 filed on Feb. 22, 2017, the content of which is hereby incorporated by reference into this application.

BACKGROUND OF THE INVENTION

Field of the Invention

The present invention relates to an automatic program generation system and an automatic program generation method.

Background Art

Creating a computer program is one of the tasks requiring advanced specialized skills. Especially when creating a large-scale and complicated program or problems where processing contents to be described are difficult, the creation cost is extremely high. As an attempt to automatically perform such a design, for example, there is genetic programming. Genetic programming is a method of structurally performing evolutionary computation by considering a program as a syntax tree.

For example, JP-A-2015-230702 is a technique related to evolutionary calculation by genetic programming. JP-A-2015-230702 discloses a processing flow generation device that gives input data and target data as problems and corrects the processing flow of the program based on the input data and the target data. In this processing flow generating device, a combinatorial structure of processing and parameters are simultaneously evolved and calculated.

SUMMARY OF THE INVENTION

However, in JP-A-2015-230702, it is necessary for a user to design items of a basic node which is a basic unit of a processing structure and parameters to be set in advance.

Mating processing and mutation processing of genetic programming are random transformations. Therefore, if a target is a complicated problem, unless basic nodes and parameters are properly set, the number of combinations of processing becomes enormous and a solution does not converge.

In JP-A-2015-230702, since the user designs the setting of the basic nodes and parameters in advance, there is a possibility that basic nodes and parameters are not properly set for complicated problems. As a result, a combinatorial explosion of processing may occur.

An object of the present invention is to automatically generate a program by suppressing a combinatorial explosion of processing.

Solution to Problem

An automatic program generation system according to an aspect of the present invention includes: an input unit that receives inputs of input data, target data, and design requirements for a first program to be generated; a program storage unit that stores a plurality of existing second programs; a program generation device that generates the first program; and an output unit that outputs the first program generated by the program generation device, in which the program generation device includes a program analysis unit that analyzes the plurality of second programs stored in the program storage unit to generate a program model, a basic node/constraint generation unit that generates basic nodes and constraints for evolutionary computation based on the program model generated by the program analysis unit and the design requirements input from the input unit, and an optimization unit that generates the first program by the evolutionary computation based on the basic nodes and the constraints generated by the basic node/constraint generation unit and the input data and the target data input from the input unit.

An automatic program generation method according to an aspect of the present invention includes receiving inputs of input data, target data, and design requirements for a first program to be generated, storing a plurality of existing second programs, analyzing the plurality of second programs to generate a program model, generating basic nodes and constraints for evolutionary computation based on the generated program model and the input design requirements, generating the first program by the evolutionary computation based on the generated basic nodes and the constraints, and the input data and the target data, and outputting the generated first program.

According to the present invention, it is possible to automatically generate a program by suppressing a combinatorial explosion.

BRIEF DESCRIPTION OF THE DRAWINGS

FIG. 4 is an example of a syntactic structure extracted by program analysis processing by the automatic program generation system of Example 1.

FIG. 5 is an example of node information possessed by a syntactic structure extracted by the program analysis processing by the automatic program generation system of Example 1.

FIG. 6B is a flowchart for explaining an outline of the program analysis processing executed by the automatic program generation system of Example 1 and is an example of a case where a program model to be generated is vector data.

FIG. 7A is an example of vector data to be generated in the program analysis processing executed by the automatic program generation system of Example 1.

FIG. 7B is an example of vector data to be generated in the program analysis processing executed by the automatic program generation system of Example 1.

FIG. 14 is a flowchart for explaining an outline of the program analysis processing executed by the automatic program generation system of Example 2.

DETAILED DESCRIPTION OF THE INVENTION

Figure 1:
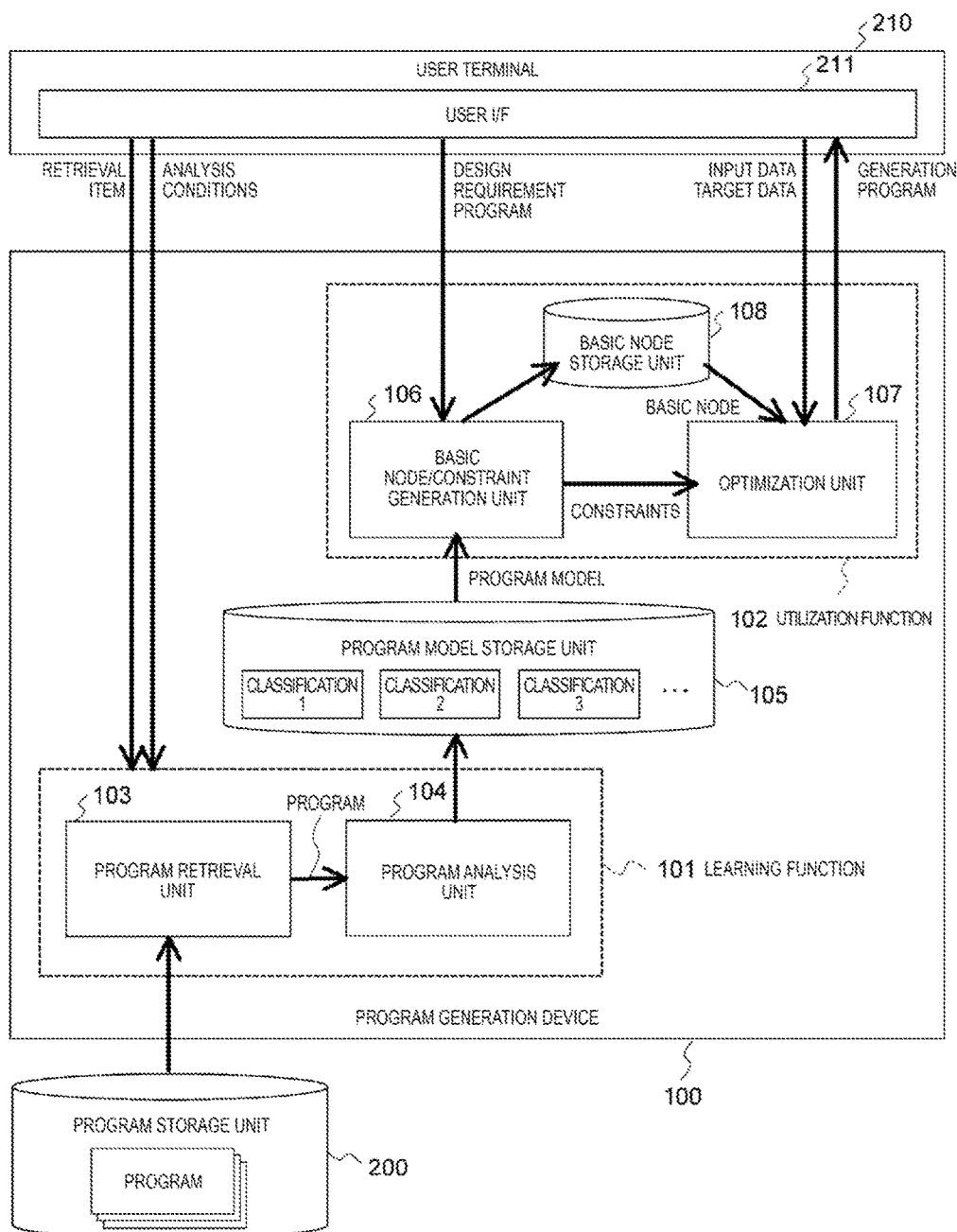
FIG. 1 is a block diagram showing a configuration example of an automatic program generation system of Example 1.

Hereinafter, examples will be described with reference to the accompanying drawings. First, the outline of the example will be described.

In evolutionary computation by genetic programming, designing constraints such as basic nodes and parameters becomes very important when performing evolutionary computation as an optimization problem. For this reason, the automatic program generation system (see FIG. 1) of the example mainly performs the following two processing functions.

(1) Program Model Learning Function 101

Knowledge is extracted from an existing program group and used for automatic generation of a program. Therefore, a program model is created from a program storage unit 200 in which a plurality of programs are stored. The program storage unit 200 is, for example, a database holding a program file or a software repository of open source software (OSS). As a software repository, a software configuration management system such as CVS, Subversion, Git, and the like are included. In a program model learning function 101, the program group (software group) is read out from the program storage unit 200 in advance and analyzed, and the analysis result is stored as a program model in a program model storage unit 105. As a result, it is not necessary for a user to design basic nodes and parameters in advance.

As a program model, there are, for example, vector data in which the meaning of the whole program is coded, and structured data in which frequent structures are extracted as a template from among plural programs. The program model storage unit 105 is a database systematically storing vector data and structured data. For example, a relational database such as SQL and XML database may be used especially when dealing with structured data.

(2) Program Model Utilization Function 102

Basic nodes and constraints are generated by using a pre-generated program model and design requirements input by the user for evolutionary computation. Then, evolutionary computation is executed by using the generated basic nodes and constraints, input data and target data to generate a program. Evolutionary computation is, for example, genetic programming. The generated basic nodes are nodes which are combinatorial elements of evolutionary computation.

There are various constraints depending on the type of program model and application method. In a narrow sense, the constraints are parameters of evolutionary computation and include the number of individuals, generation number, an intersection probability, a mutation probability, and the like. In addition, in a broad sense, selection weights based on classification information of nodes, selection probabilities of nodes, and the like are included. The design requirements input by the user include, for example, the type of utilization program, the type of library, the style, and the like. Further, in the case of generating a program improved by correcting the program, it is also possible to include the program before correction in the design requirements. In evolutionary computation, a program is represented by a tree structure, and the tree structure optimized by evolutionary computation is converted and output into corresponding program codes.

By executing the processing having the above two functions (the program model learning function 101, the program model utilization function 102), knowledge is extracted from existing programs included in the database or software repository to create a program model. Furthermore, the generated program model may be utilized for evolutionary computation of, for example, genetic programming. Therefore, even for complicated problems, it is possible to automatically generate programs without a combinatorial explosion of processing.

Example 1

Hereinafter, the automatic program generation system of Example 1 will be described with reference to FIGS. 1 and 2.

Figure 2:
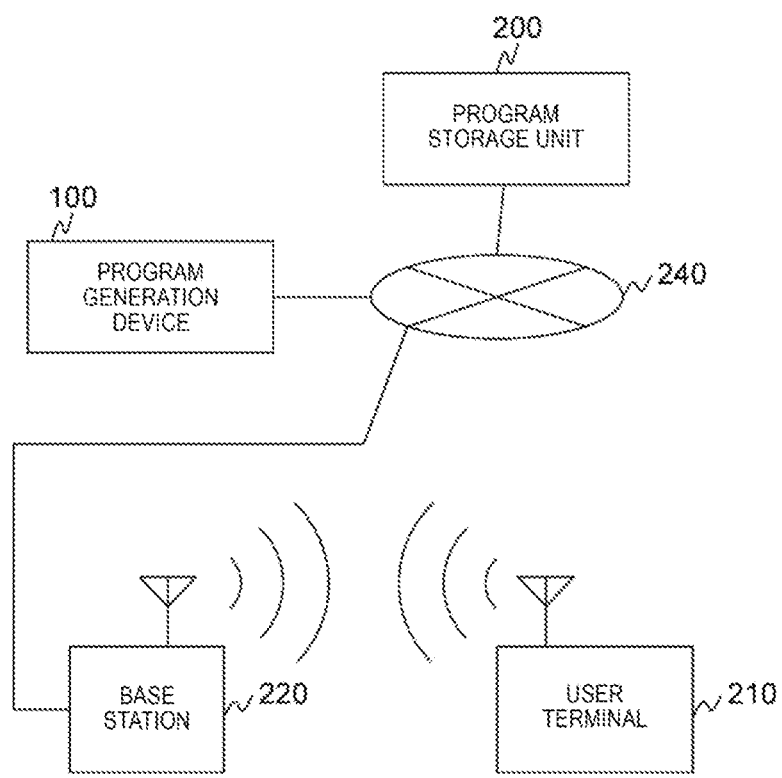
FIG. 2 is a block diagram showing an example of a system configuration to which the automatic program generation system of Example 1 is applied.

The system shown in FIG. 2 includes a program generation device 100, a base station 220, a user terminal 210, and the program storage unit 200. The program generation device 100, the base station 220 and the program storage unit 200 are connected to each other via a network 240. The network 240 may be, for example, a WAN, a LAN, or the like, but is not limited to the type of the network 240. The user terminal 210 is connected to the program generation device 100 via wireless communication via the base station 220. The user terminal 210 and the base station 220 may be connected via wired communication, and the user terminal 210 may be connected directly to the network 240.

The user terminal 210 is, for example, a device such as a personal computer or a tablet terminal. The user terminal 210 includes a processor (not shown), a memory (not shown), a network interface (not shown), and an input/output device (not shown). The input/output device includes a display, a keyboard, a mouse, a touch panel, and the like.

The user terminal 210 provides a user interface (user I/F) 211 for operating the program generation device 100. The user interface 211 inputs design requirements, input data and target data to the program generation device 100 and receives programs output from the program generation device 100.

The program generation device 100 is, for example, a computer having a processor (not shown), a memory (not shown), a network interface (not shown) and a storage device (not shown) as a hardware configuration.

The program generation device 100 executes program generation processing according to the instruction of the user terminal 210. Program data is acquired from the program storage unit 200, and the obtained program data is analyzed. Program data to be analyzed which is retrieved and read from the program storage unit 200 is stored in an internal storage device or memory. An execution program for the program generation processing and the information used at the time of executing the program are stored in the memory. By executing the program by a processor, various functions possessed by the program generation device 100 may be realized. In the following description, when describing the processing mainly by functional units, it indicates that a program realizing the functional units is being executed by the processor.

The program storage unit 200 is, for example, a database holding a program file or a software repository of open source software (OSS). The software repository includes a software configuration management system such as CVS, Subversion, Git, and the like.

With reference to FIG. 1, the execution program and information for program generation processing stored in a memory will be described.

The program generation device 100 has two functions, the program model learning function 101 and the program model utilization function 102 and configured of a plurality of program modules. Specifically, the program generation device 100 includes a program retrieval unit 103, a program analysis unit 104, the program model storage unit 105, a basic node/constraint generation unit 106, an optimization unit 107, and a basic node storage unit 108.

The program retrieval unit 103 receives a retrieval item and a keyword from the user interface 211 and accesses the program storage unit 200 to acquire a program. The acquired program is stored in the internal storage device or the memory.

The program analysis unit 104 analyzes the acquired program and generates a program model. The generated program model is stored in the program model storage unit 105.

The program model storage unit 105 stores the generated program model. The program model storage unit 105 may be an internal storage device or memory or a server or database connected via the external network 240.

The basic node/constraint generation unit 106 receives design requirements from the user interface 211, extracts a program model satisfying design requirements from the program model storage unit 105, and generates basic nodes and constraints. The generated basic nodes are stored in the basic node storage unit 108.

The optimization unit 107 receives the basic nodes and constraints and executes evolutionary computation to generate a program. The generated program is output to the user terminal 210 via the user interface 211.

The basic node storage unit 108 stores the generated basic nodes. The basic node storage unit 108 may be an internal storage device or memory or a server or database connected via the external network 240.

Figure 3:
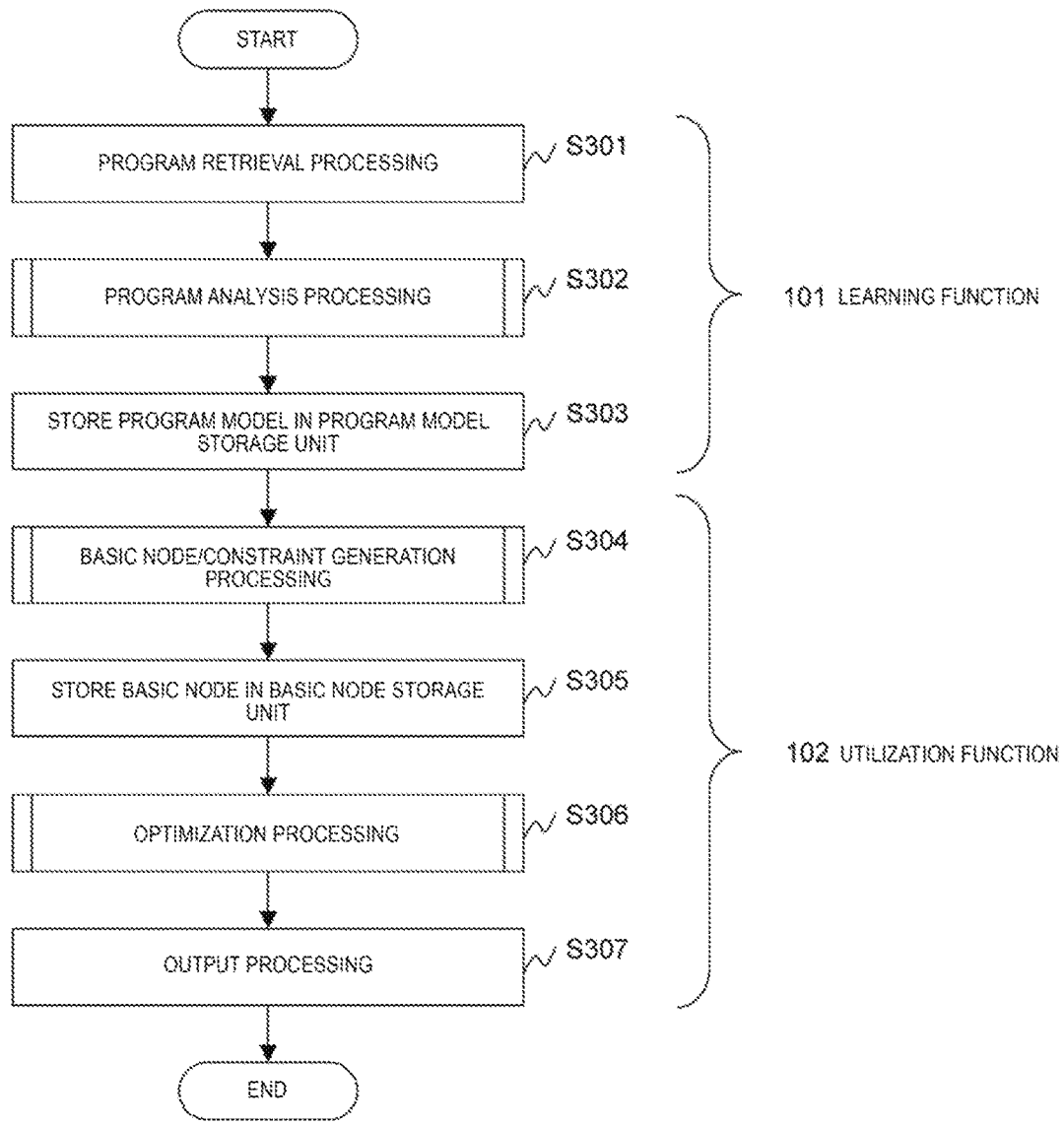
FIG. 3 is a flowchart for explaining an outline of processing executed by the automatic program generation system of Example 1.

Next, with reference to FIG. 3, processing executed by the program generation device 100 will be described.

The program generation device 100 executes the following processing when receiving a start of processing from the user terminal 210.

Program Model Learning Function 101

The program generation device 100 receives a retrieval item such as a keyword, specification of a target database or software repository, specification of a period, and the like from the user interface 211 and retrieves a corresponding program group from the program storage unit 200 based on the information via the external network 240 (step S301). Specifically, the program retrieval unit 103 retrieves a program group. The retrieved and extracted program group is stored in the internal storage of the program generation device 100.

The program generation device 100 executes program analysis processing on the extracted program group (step S302). Specifically, the program analysis unit 104 executes program analysis processing. In program analysis processing, the program is transformed into a tree structure such as an abstract syntax tree (AST) as shown in FIG. 4 and is processed based thereon.

There are various embodiments of the program analysis processing and the generated program model. For example, as a program model to be generated, vector data calculated for respective individuals and nodes of a tree, template data in which similar structures between a plurality of tree structures are extracted, and probability transition graph data to be generated by overlapping between the plurality of tree structures. The program analysis processing executed by the program analysis unit 104 will be described later with reference to FIGS. 6A, 6B, 6C, and 6D.

The program generation device 100 stores the generated program model in the program model storage unit 105 (step S302). More specifically, the program analysis unit 104 executes storing in the program model storage unit 105. The program model created by program analysis processing is systematically stored in the program model storage unit 105 in consideration of the analysis contents and the data structure of the program model.

The processing of steps S301 to S303 corresponds to the program model learning function 101. In these steps, knowledge of the existing program group stored in the program storage unit 200 is learned by the program analysis unit 104 and stored in the program model storage unit 105 as a program model.

Program Model Utilization Function 102

The program generation device 100 generates basic nodes and constraints necessary for evolutionary computation using the program model generated by the program model learning function 101 and the design requirements input by the user (step S304). Specifically, the basic node/constraint generation unit 106 executes basic node/constraint generation processing. The design requirements input by the user includes, for example, the type of utilization program, the type of library, the style, and the like. These requirements are used to refer to the program model for the program model storage unit 105.

The basic node is a basic element constituting each node of the tree structure. For example, n0 to n8 of the tree structure shown in FIG. 4 represent basic elements, and the contents are, for example, the nodes described in the table of FIG. 5. The nodes shown in FIG. 5 have a fine granularity of meaning, but nodes having large granularity using the program model are created to enhance the convergence of evolutionary computation.

There are various constraints depending on the type of program model and application method. In a narrow sense, the constraints are parameters of evolutionary computation and include the number of individuals, generation number, an intersection probability, a mutation probability, and the like. In addition, in a broad sense, selection weights based on classification information of nodes, selection probabilities of nodes, and the like are included. The constraints may also be specified directly in the user's design requirements. The basic node/constraint generation processing executed by the basic node/constraint generation unit 106 will be described later.

The program generation device 100 stores the generated basic nodes in the basic node storage unit 108 (step S305). Specifically, the basic node/constraint generation unit 106 executes storing in the basic node storage unit 108. Here, the basic node storage unit 108 is an internal storage or module in the memory.

The program generation device 100 executes evolutionary computation based on the generated basic nodes and constraints to generate a program (step S306). Specifically, the optimization unit 107 executes evolutionary computation by genetic programming. The optimization unit 107 receives input data and target data as inputs via the user interface 211. A compatibility is determined from the comparison of the output data and the target data with respect to the input data.

In evolutionary computation, in the program group expressed by the tree structure, the compatibility is evaluated by repeating the operation of genetic programming such as mutation, intersection, and the like, and once the processing reaches a predetermined generation or a solution converges, the processing ends. The optimization unit 107 converts the converged tree structure at the time of termination into program codes. The optimization processing executed by the optimization unit 107 will be described later.

The program generation device 100 outputs the generated program codes to the user terminal 210 via the user interface 211 (step S307). At this time, the program codes may be displayed on the screen at the user terminal 210. In addition, it is possible to inform only the completion of the creation of the program codes, and the user may inquire of the program generation device 100 to download the program codes.

The processing from steps S304 to S307 corresponds to the program model utilization function 102. In these steps S304 to S307, knowledge of the existing program group stored in the program storage unit 200 is utilized by optimization processing, and a program is generated.

Description of Each Processing

Figure 6A:
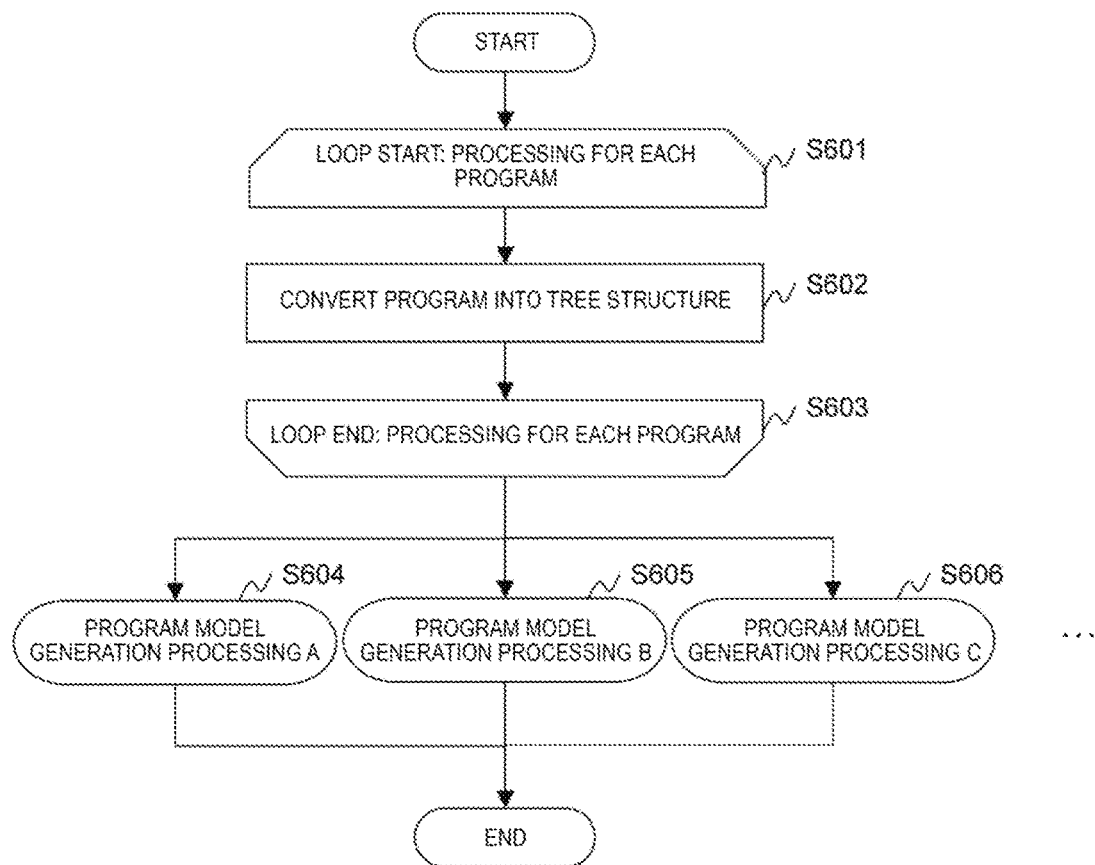
FIG. 6A is a flowchart for explaining an outline of the program analysis processing executed by the automatic program generation system according to Example 1.
Figure 6C:
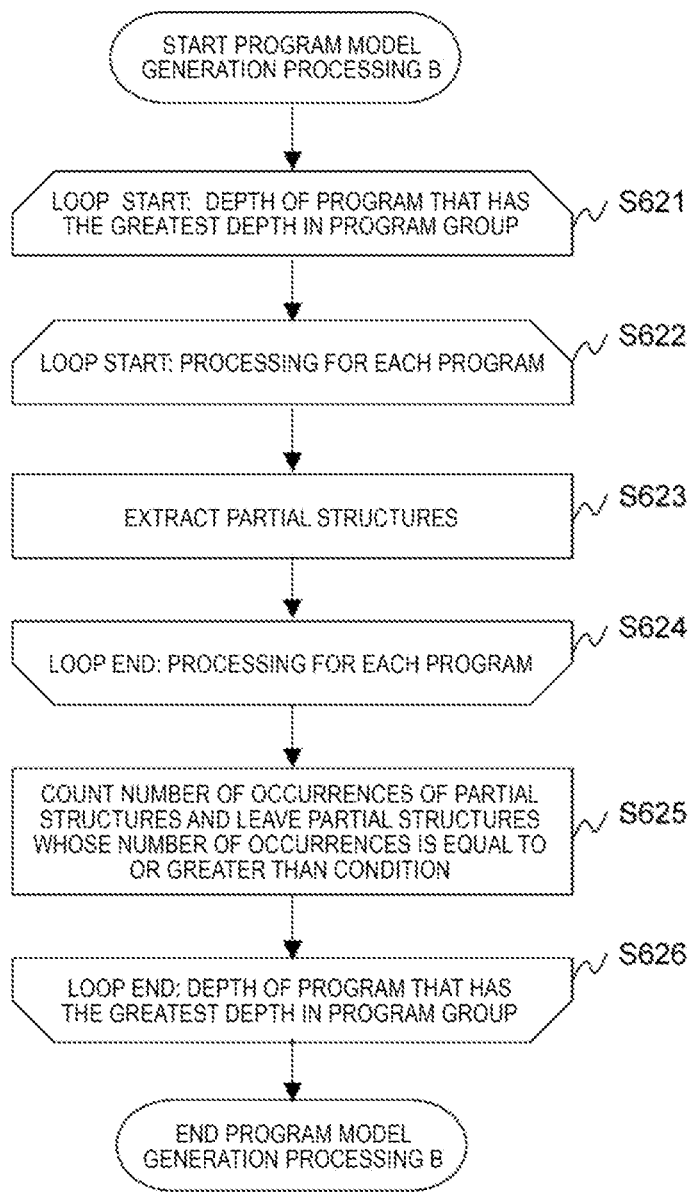
FIG. 6C is a flowchart for explaining an outline of the program analysis processing executed by the automatic program generation system of Example 1 and is an example of a case where a program model to be generated is template data.
Figure 6D:
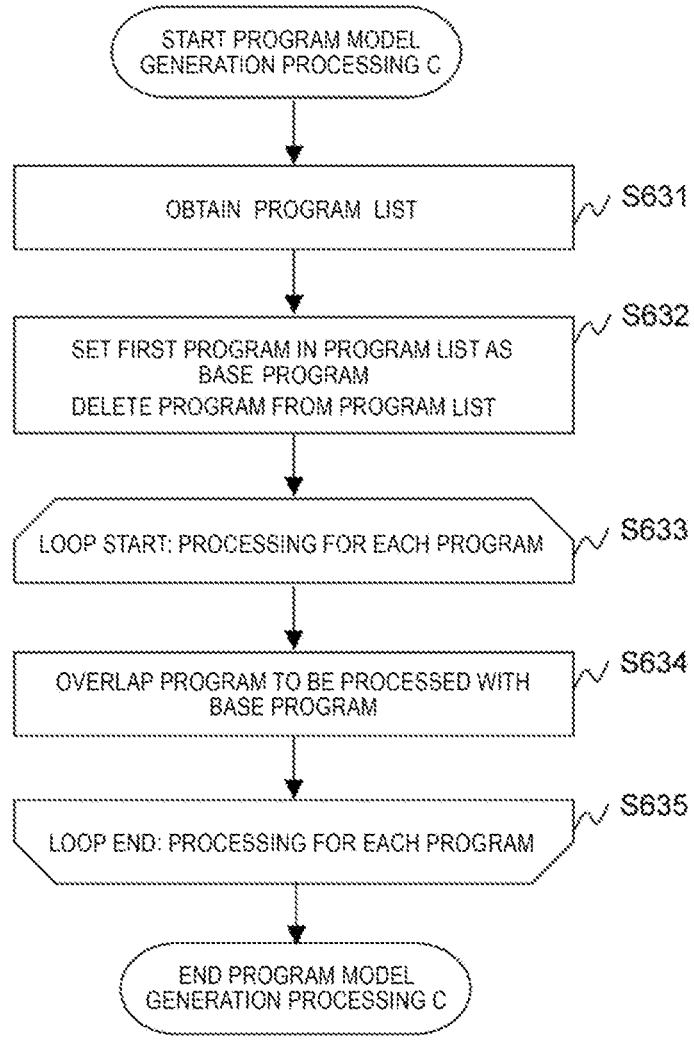
FIG. 6D is a flowchart for explaining an outline of the program analysis processing executed by the automatic program generation system of Example 1 and is an example of a case where a program model to be generated is a probability transition graph.

With reference to FIG. 6A, the outline of processing executed by the program analysis unit 104 of Example 1 will be described. Here, FIG. 6B is a flowchart for explaining an overview of one mode of processing executed by the program analysis unit 104 of Example 1. Here, FIG. 6C is a flowchart for explaining an overview of one mode of processing executed by the program analysis unit 104 of Example 1. Here, FIG. 6D is a flowchart for explaining an overview of one mode of processing executed by the program analysis unit 104 of Example 1.

Figure 8A:
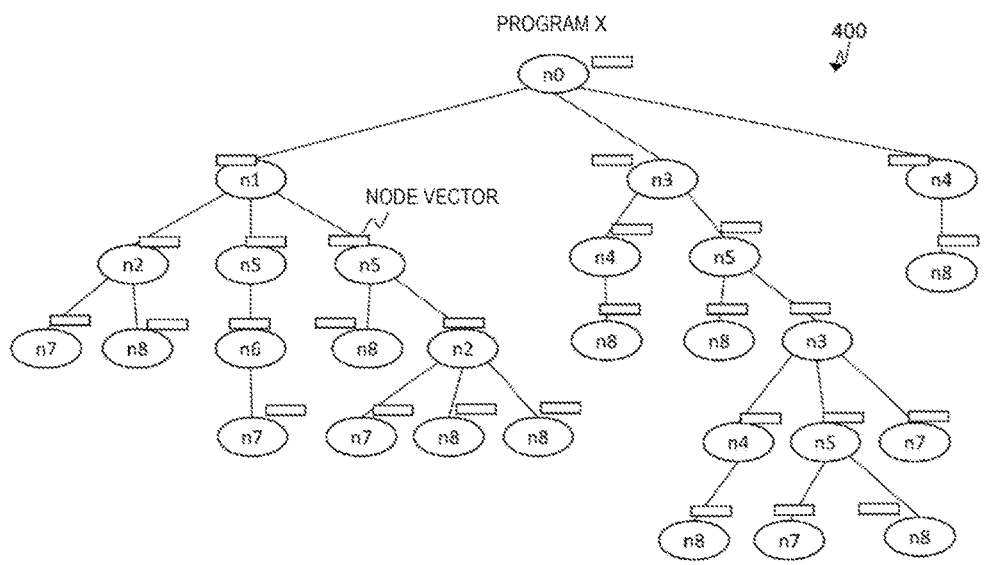
FIG. 8A is an example of a learning process of vector data to be generated in the program analysis processing executed by the automatic program generation system of Example 1.
Figure 8B:
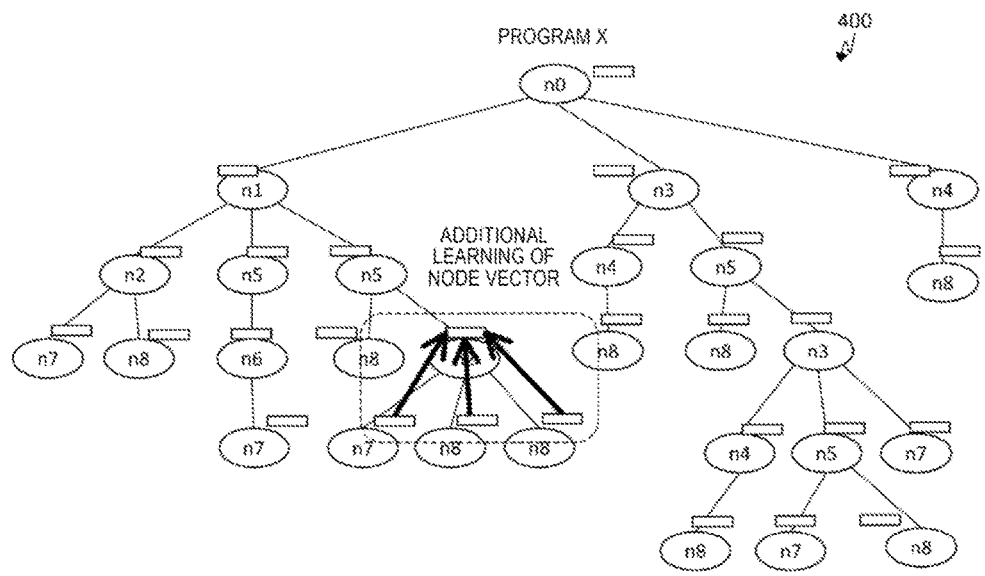
FIG. 8B is an example of a learning process of vector data to be generated in the program analysis processing executed by the automatic program generation system of Example 1.
Figure 9:
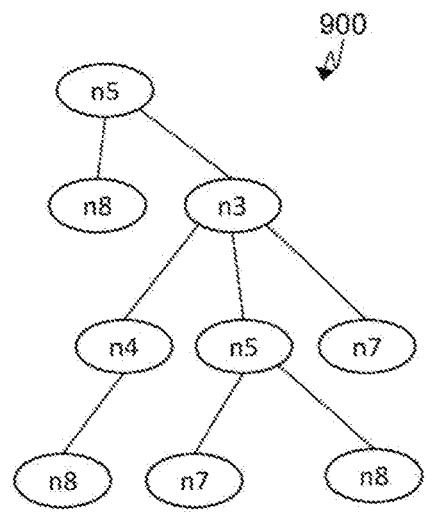
FIG. 9 is an example of template data to be generated in the program analysis processing executed by the automatic program generation system of Example 1.
Figure 10:
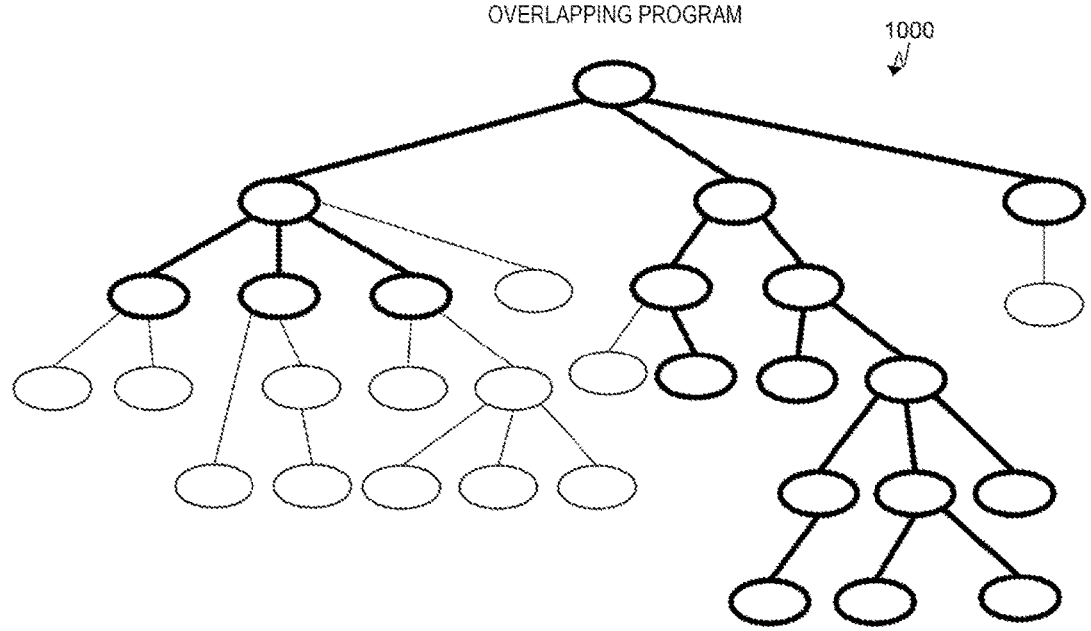
FIG. 10 is an example of a probability transition graph to be generated in the program analysis processing executed by the automatic program generation system of Example 1.

FIGS. 7A and 7B are explanatory diagrams showing examples of a node dictionary to be created in the implementation of FIG. 6B. FIGS. 8A and 8B are explanatory diagrams showing examples of learning of node vectors in the implementation of FIG. 6B. FIG. 9 is an explanatory diagram showing an example of an extracted model in the implementation of FIG. 6C. FIG. 10 is an explanatory diagram showing an example of a created model in the implementation of FIG. 6D.

The program analysis unit 104 learns and generate a program model from the program group as inputs. First, the program analysis unit 104 converts the program into a tree structure for each input program (step S601) (step S602). The tree structure for the program is, for example, an abstract syntax tree. The program is represented by a structure as shown in FIG. 4, and each node has a meaning as shown in FIG. 5, for example. There are various embodiments of the program analysis processing and the generated program model. Example of a program model to be generated include vector data calculated for the program and nodes of a tree, template data in which similar structures between a plurality of tree structures are extracted, and probability transition graph data to be generated by overlapping between the plurality of tree structures.

Hereinafter, an embodiment of a program model will be described with reference to FIGS. 6B, 6C, and 6D.

FIG. 6B is an embodiment in the case where vector data calculated for each node of a program or a tree structure is defined as a program model.

First, the program analysis unit 104 creates a node dictionary from an input program group (step S611). The node dictionary is a list enumerating types of nodes appearing in all input programs. FIG. 7A is an example of a node dictionary corresponding to FIG. 4, and the types of nodes appearing in a program X400 and a program Y401 are enumerated.

The program analysis unit 104 learns the node vector for each item of the node dictionary (step S612) (step S613). The node vector is a multidimensional vector set for each type of node, and an initial value is, for example, a random value. The node vectors are derived by extracting the relationship between all the parent nodes and child nodes of the syntax tree and repeatedly learning the nodes by using a machine learning method or the like as samples. As a machine learning method, a neural network method, or the like may be used. When learning of the node vectors (step S613) is completed, vector information is given to items of each node as shown in FIG. 7B.

FIG. 8A illustrates a state in which the node vectors are added to the program X400 of FIG. 4 at the end of the learning of the node vector. As can be seen from the table of FIG. 7B, the same node vectors are added to the same place of labels such as n0, n1, n2, . . . of the node of FIG. 8A. The dimension number of the node vector is a parameter and may be set in advance or may be specified by setting analysis conditions via the user interface 211 each time analysis is performed.

The program analysis unit 104 performs additional learning of the node vectors from the end of the tree, that is, from the leaf portion, for each program (step S615) (step S616). In step S616, with the node vectors learned in step S613 as initial values, the vector information is integrated such that the node closer to the root may include the information of the lower layer nodes. FIG. 8B shows additional learning of node vectors, and vector information is recursively integrated at the upper layer nodes from the lower layer nodes. To integrate vector information, the linear combination may be used, or a partial structure may be learned and obtained as a structure of a neural network.

By executing the above processing, the program analysis unit 104 obtains vector information having a higher abstraction level as the node vectors of the upper layer. Focusing on the topmost node, the meaning of the program may be represented by a vector. In the embodiment of FIG. 6B, the structured data of the program and the vector data of each node are output as a program model.

FIG. 6C is an embodiment in the case where template data obtained by extracting similar structures between a plurality of tree structures is defined as a program model.

In order to extract a common structure from a plurality of existing programs, the program analysis unit 104 extracts partial structures from syntax trees of all programs (step S623), extracts a common structure based on the number of occurrences of the partial structures (step S625). An initial partial structure is a two-node structure, and in the repetition of step S621, the common structure is extracted while expanding the common partial structure. FIG. 9 is a tree structure in which a common structure is extracted corresponding to FIG. 4. In this embodiment, a common structure that perfectly matches is extracted, but it is not limited thereto and any similar structure may be used. The number of occurrences is a parameter and may be set in advance or may be specified by setting analysis conditions via the user interface 211 each time analysis is performed.

By executing the above processing, the program analysis unit 104 may extract a model of a partial tree having a similar structure. In the embodiment of FIG. 6C, a model of a partial tree having this similar structure is output as a program model.

FIG. 6D shows an embodiment in the case where the probability transition graph data generated by overlapping among a plurality of tree structures is set as a program model.

First, the program analysis unit 104 creates a program list (step S631). Then, a first program in the program list is set as a base program (step S632). For each item of the program list, the tree structure of a target program is overlapped on the tree structure of the base program (step S634). At this time, by overlapping the structures, the weights of edges (sides) or nodes of overlapping parts increase, and the overlapped tree structure becomes a probability transition graph. FIG. 10 shows an example of the probability transition graph in the case where the target program is the program X400 and the program Y401 of FIG. 4. The edges and nodes indicated by thick lines are overlapping portions, and high likelihood (probability) is set as compared with other edges and nodes.

By executing the above processing, the program analysis unit 104 may create a probability transition graph having a probability with respect to the program structure. In the embodiment of FIG. 6D, this probability transition graph is output as a program model.

Figure 11:
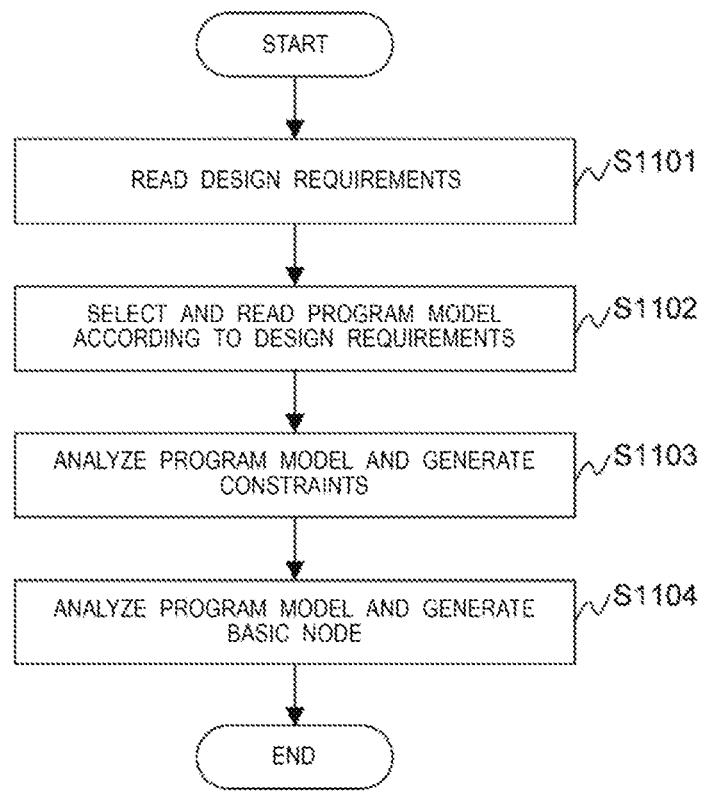
FIG. 11 is a flowchart showing an outline of basic node/constraint generation processing executed by the automatic program generation system of Example 1.

Next, with reference to FIG. 11, the outline of processing executed by the basic node/constraint generation unit 106 will be described.

The basic node/constraint generation unit 106 generates basic nodes and constraints for evolutionary computation using the user's design requirements and program model input via the user interface 211.

The basic node/constraint generation unit 106 reads design requirements of the user input via the user interface 211 (step S1101). Here, the design requirements include, for example, the type of utilization program, the type of library, the style, and the like. In the case of generating a program improved by correcting the program, it is also possible to include the program before correction in the design requirements.

The basic node/constraint generation unit 106 selects and reads a program model according to design requirements. If the type of utilization program is selected as the design requirements, a program model from a similar program is selected. In addition, it is also possible to select which model of vector data, template data, or probability transition graph to use or to use in combination.

The basic node/constraint generation unit 106 generates constraints according to the program model and design requirements (step S1103). Here, there are various constraints depending on the type of program model and application method. For example, in a narrow sense, the constraints are parameters of evolutionary computation and includes the number of individuals, the generation number, an intersection probability, a mutation probability, and the like. In addition, in a broad sense, selection weights based on classification information of nodes, selection probabilities and mutation probabilities of nodes, and the like are included.

The basic node/constraint generation unit 106 may use a parameter set in advance that is necessary for evolutionary computation, which is constraints in a narrow sense, or may use a parameter set specified by the user in the design requirements. The basic node/constraint generation unit 106 generates constraints in a broad sense mainly by analysis of a program model.

For example, in the programming model based on vector data, the similarity between nodes may be easily calculated from vector data. Therefore, it is possible to express program likelihood by classifying vector data stored in the program model storage unit 105 in advance into a plurality of categories (classification 1, classification 2, classification 3, and the like). By comparing the classification of these nodes and the nodes of intersection and mutation targets, it is possible to preferentially exclude parts that do not have program likelihood. Therefore, constraints are given as selection weights according to the node classification information.

For example, in the programming model based on vector data, in generation of an initial group in evolutionary computation to be described later, by the classification information that may express program likeliness, it is possible to generate individuals having a structure more programmable rather than random, and to include the individuals in the group preferentially.

For example, in the programming model by template data or probability transition graph, the more meta-structure of the program may be used for updating evolutionary computation. Especially, in a probability transition graph, probability transition between nodes is defined, and naturalness of connection between nodes may be expressed as a probability. By using this information, it is possible to orient random changes in ordinary evolutionary computation so as to preferentially exclude unnatural parts of the connection and generate more natural programs. Therefore, the constraints are given as a node selection probability and a mutation probability.

The basic node/constraint generation unit 106 generates basic nodes for evolutionary computation according to the program model and design requirements (step S1104). The basic node is a basic element constituting each node of the tree structure in evolutionary computation. As mentioned above, using the program model, nodes with large basic granularity are created and convergence of evolutionary computation is improved.

In a case where the elements having the structure information, such as library information, are specified in the design requirements, the basic node/constraint generation unit 106 may directly include the elements in the basic nodes.

The basic node/constraint generation unit 106 generates basic nodes mainly by analyzing the programming model. For example, in the case of a programming model based on vector data, representative vectors may be extracted from classification information expressing program likelihood and partial structures constituting the nodes corresponding to the vectors may be added to the basic nodes.

For example, in the case of a programming model based on template data, the structure given as a template may be added to the basic node as it is.

By executing the above processing, the basic node/constraint generation unit 106 may generate various basic nodes and constraints by utilizing the programming model.

Figure 12:
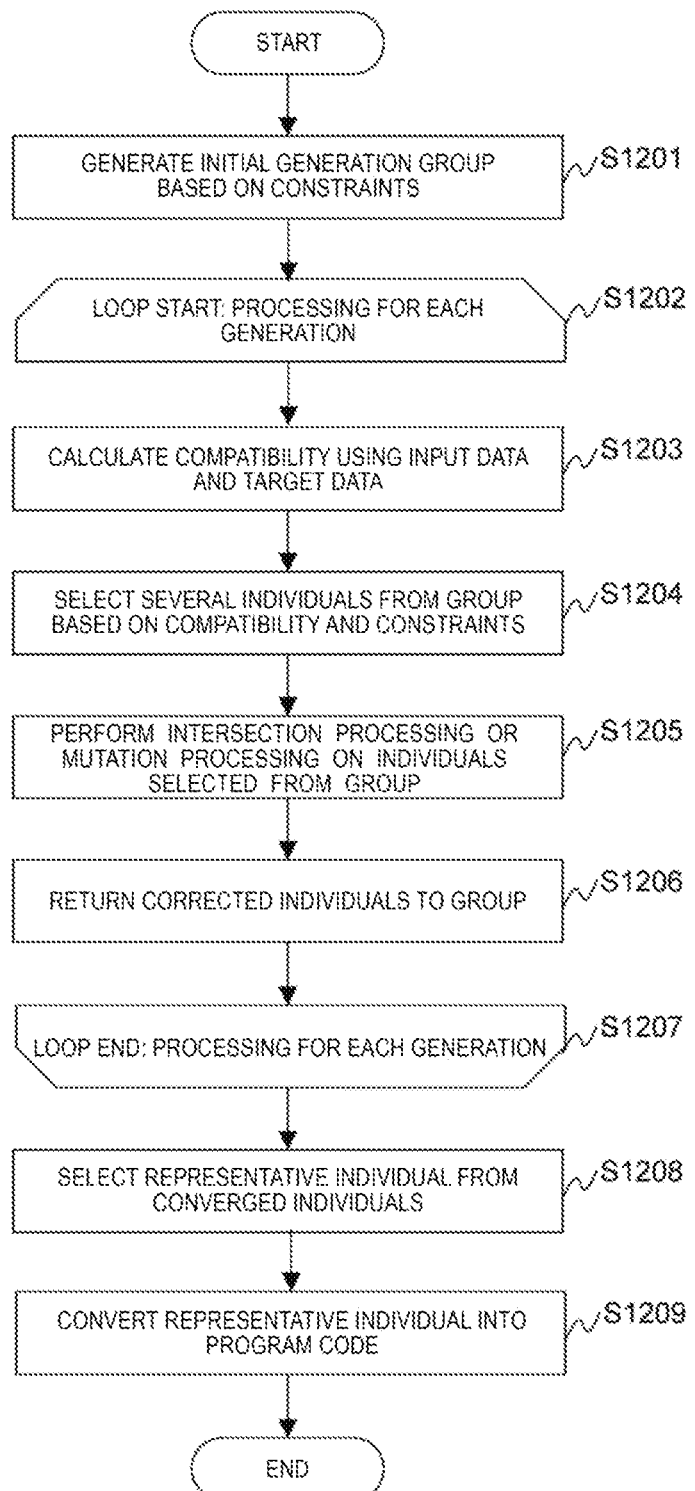
FIG. 12 is a flowchart showing an outline of optimization processing executed by the automatic program generation system of Example 1.

Next, with reference to FIG. 12, the outline of the processing executed by the optimization unit 107 will be described.

The optimization unit 107 executes evolutionary computation by genetic programming based on the generated basic nodes and constraints.

The optimization unit 107 generates an initial generation group based on the constraints (step S1201). The number of individuals, the generation number, the intersection probability, and the mutation probability are set as constraints. In a case where a probability is given to the generation of individuals by the classification generated by the program model, individuals are generated by using the information, and a group is generated by repeating the generation of the individuals. In a case where there is no supplementary information, an initial individual is randomly generated. As the basic nodes for generating individuals, the basic nodes generated by the basic node/constraint generation unit 106 are used.

The optimization unit 107 executes evolutionary computation for each generation (step S1202). First, using the input data and target data input, a compatibility is calculated. Here, the compatibility represents the distance between the output data of the individuals with respect to the input data and the target data. Whether the individuals have reached the desired evolutionary stage or not is determined by the degree of the compatibility.

The optimization unit 107 selects individuals from the group based on the compatibility and constraints (step S1204). Using a probability distribution proportional to the compatibility, several individuals to be mutated are selected. At this time, in a case where the classification data generated by the program model exists in the selection of the individuals, the probability thereof is also taken into consideration.

The optimization unit 107 performs intersection processing or mutation processing on the individuals selected from the group (step S1205). Intersection processing or mutation processing is determined by the intersection probabilities and the mutation probabilities. In the case of determining to intersect or mutate nodes, the selection probabilities generated from the program model is taken into consideration, if exist. If the selection probabilities do not exist, the selection probabilities are randomly determined.

The optimization unit 107 returns corrected individuals to the group (step S1206). The optimization unit 107 repeats the processing from step S1202 to step S1207 until the generation number reaches a predetermined number. Alternatively, the optimization unit 107 repeats until a certain number of converged individuals (individuals whose output data and target data match) appear.

The optimization unit 107 selects representative individuals from the converged individuals (step S1208). Here, for example, since the individuals are written in a simple structure rather than a complex structure, individuals with a small tree structure size are preferentially selected.

The optimization unit 107 converts the representative individuals into program codes (step S1209).

By executing the above processing, the optimization unit 107 may improve the convergence of the solution by utilizing the basic nodes and constraints generated from the program model.

According to Example 1, the program generation device 100 extracts knowledge from existing programs contained in a database or software repository and creates a program model such as vector data, template data, and a probability transition graph. Basic nodes and constraints are generated from the generated program model and used for evolutionary computation of genetic programming. By using the generated basic nodes and constraints, it is possible to automatically generate a program without causing a combinatorial explosion even for complicated problems.

Example 2

Hereinafter, the automatic program generation system of Example 2 will be described with reference to FIGS. 13 and 14. First, the outline of Example 2 will be described.

At the site of program development, the use of a large-scale software repository is progressing. The software repository is a database that accumulates deliverables such as programs, documents, and bug reports. While there is a merit of being able to manage, share, and reuse software resources, due to the progression of large-scale, the time and effort of retrieving for reuse and ensuring reliability are also increasing. On the other hand, there is a movement to give the universal meaning of the program. Machine learning such as deep learning and the like is drawing attention in the artificial intelligence field as a method related to the meaning of a program, and especially in the natural language field, there is remarkable progress in the meaning of words and sentences. It is an approach to learn to handle the concept of words by vectorization. Constructive learning is possible by treating the program as an abstract syntax tree (AST), and the semantic representation of the whole program is acquired by node-level vectorization of the abstract syntax tree (AST) and a tree-based neural network.

In order to utilize existing programs, classification models learned from existing programs are necessary, and meaning and representation methods of universal programs are necessary. As a representation method of the program, in addition to not only the syntactic structure, but also a mechanism capable of creating a vector expression considering the dependency of program processing, both syntactic information and semantic information are used. As a result, as a semantic representation method of the program, vector representation of the program including the dependency of program processing may be made in addition to syntactic structure information. As a result, a high accuracy may be achieved in classification problems of programs and the like.

In Example 2, in the processing of the program analysis unit 104, particularly in the program model based on vector data, not only a structure of the abstract syntax tree but also vector data including the dependency of program processing such as states and functions are generated. In this way, Example 2 uses both syntactic information and semantic information.

In Example 2, Example 2 will be described focusing on the difference from Example 1. The same reference numerals are given to the same components as in Example 1, and a detailed description thereof will be omitted.

Figure 13:
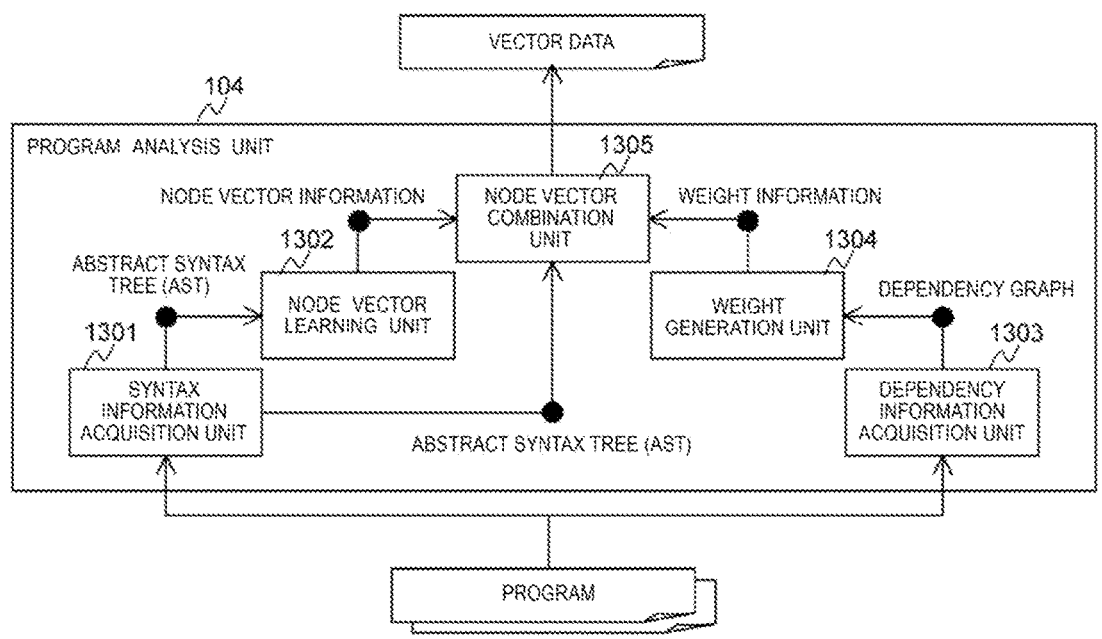
FIG. 13 is a block diagram showing a configuration example of a program analysis device executed by the automatic program generation system of Example 2.

FIG. 13 is a block diagram showing a configuration example of the program analysis unit 104 of Example 2. The program analysis unit 104 of Example 2 includes a syntax information acquisition unit 1301, a node vector learning unit 1302, a dependency information acquisition unit 1303, a weight generation unit 1304, and a node vector combination unit 1305.

The syntax information acquisition unit 1301 converts the input program into a tree structure. The node vector learning unit 1302 learns the node vector for each item of the node dictionary by using the tree structure of all the converted programs.

The dependency information acquisition unit 1303 extracts the dependency described in the program from the input program. The dependency information includes, for example, a function reference relationship. The function reference relationship may be based on dependencies of different granularity such as source, class, data, and the like. The dependency information is described in a graph structure as a dependency graph, for example. The weight generation unit 1304 receives the generated dependency information as an input and generates a weight indicating importance for each node. The node vector combination unit 1305 combines vectors by using the generated node vector information and weight information to obtain vector data of the corresponding program.

With reference to FIG. 14, the processing executed by the program analysis unit 104 of Example 2 will be described. First, the program analysis unit 104 converts the program into a tree structure for each input program (step S601) (step S602). This processing is the same as that in Example 1. Subsequently, as in FIG. 6A, learning of node vectors is performed (steps S611 to S614).

Next, in parallel with the learning of the node vectors, dependency extraction processing is performed for each program (step S1404). The dependency information is, for example, a function reference relationship. It may be based on another granularity dependency such as source, class, and data. The dependency information is described in a graph structure as a dependency graph, for example.

Figure 15A:
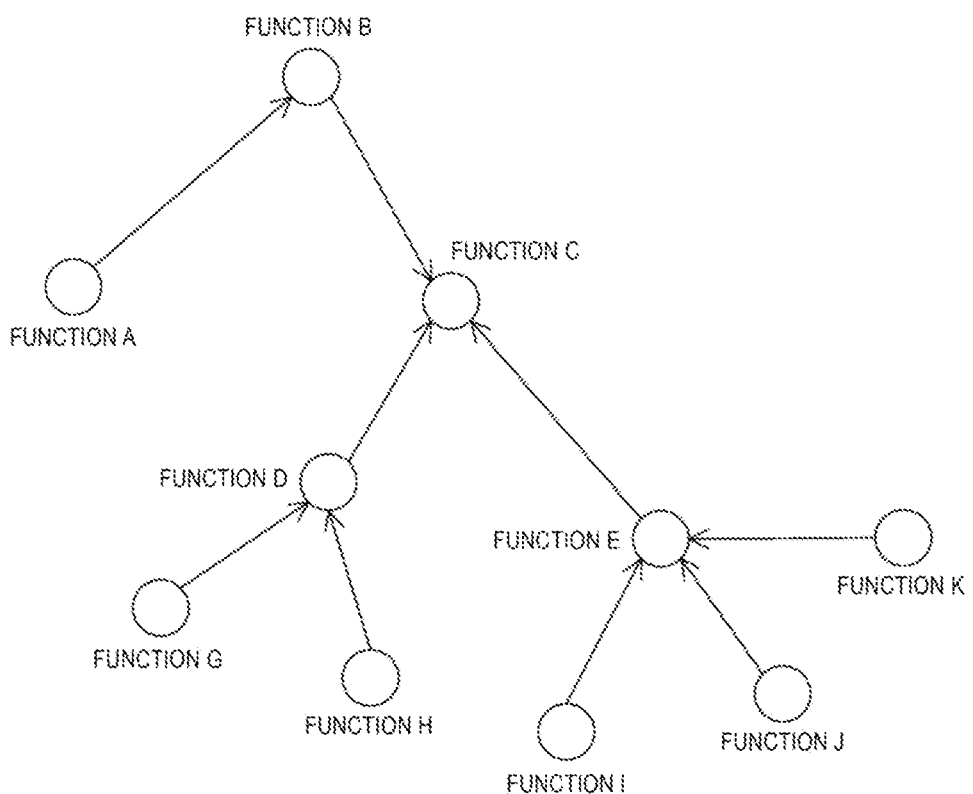
FIG. 15A is an example of a dependency graph to be generated in the program analysis processing executed by the automatic program generation system of Example 2.

FIG. 15A shows an example of a dependency graph when the dependency is used as a function reference relationship. An element with dependency as a node and a relationship as an edge are connected to generate a graph. In FIG. 15A, a function is a node and, for example, in a case where a function B refers to a function A, the connection from the function A to the function B is described as a valid edge. Also, since a function C refers to a function D and a function E, the connection from the function D to the function C is set as a valid edge, and the connection from the function E to the function C is described as another valid edge. In a computer program, the dependency graph may be given by, for example, a neighbor list.

Figure 15B:
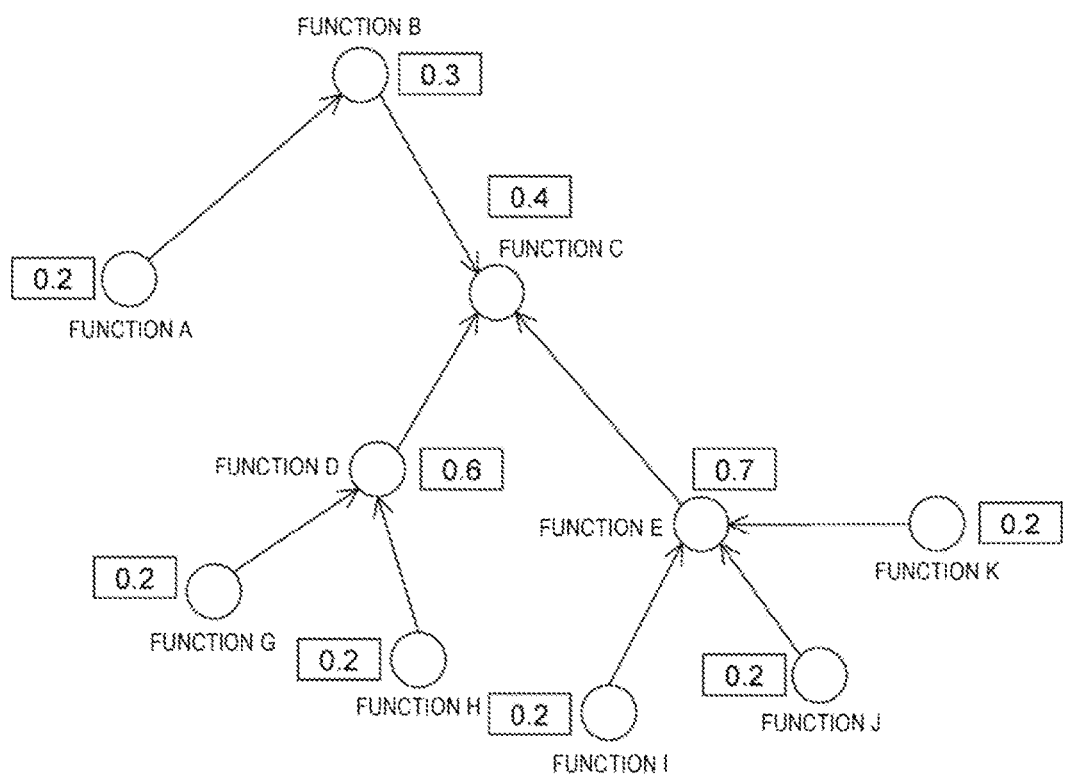
FIG. 15B is an example of weight information added to the dependency graph to be generated in the program analysis processing executed by the automatic program generation system of Example 2.

Based on the generated dependency information, the program analysis unit 104 generates weight information to be added to each node of the syntax tree. For example, by executing centricity calculation on the dependency graph of FIG. 15A, the importance of each node on the graph as shown in FIG. 15B may be calculated.

For the centricity calculation performed on the dependency graph, for example, mediation centricity that gives a high score to those that mediate among many nodes may be used. For example, since the function E refers to a function I, a function J and a function K, a high score (0.7) is given as the weight information to be added to the node of the function E. On the other hand, since the node of the function A does not refer to any node, a low score (0.2) is given as the weight information to be added to the node of the function A.

Figure 16:
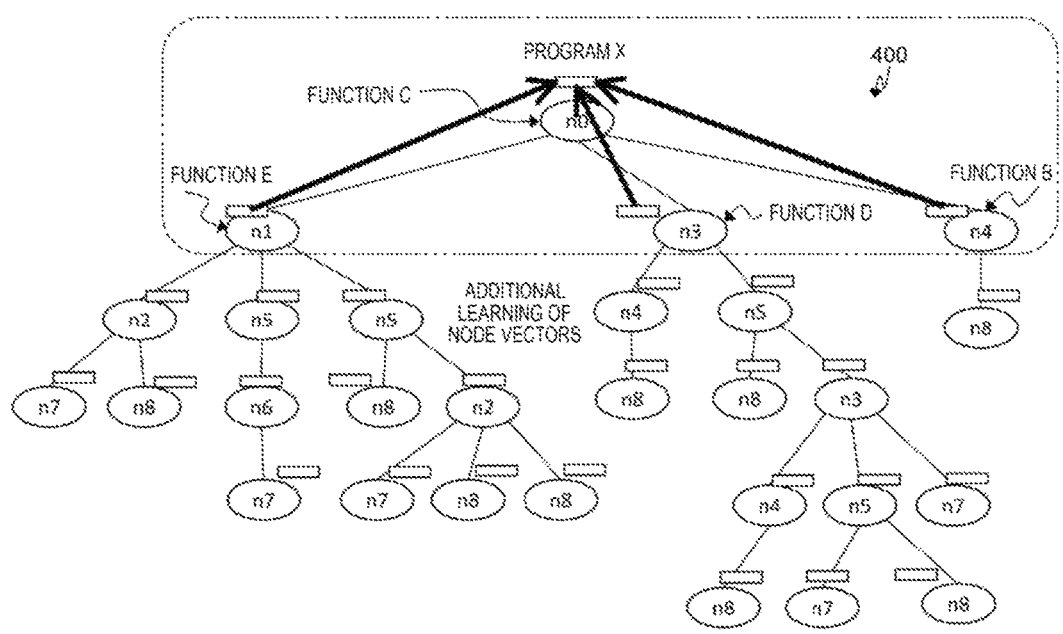
FIG. 16 is an example of a learning process of vector data to be generated in the program analysis processing executed by the automatic program generation system of Example 2.

By assigning importance calculated for each node to each node on the syntax tree, weights are given to the combination of corresponding node vectors. FIG. 16 shows an example where the syntax tree 400 has n0 as the function C in FIG. 15A, n1 as the function E, n3 as the function D, and n4 as function B. The weight information derived from the dependency graph is used to combine n0 (function C) by combining n1 (function E), n3 (function D), and n4 (function B).

The program analysis unit 104 executes node vector combination processing (step S1409). The connection relationship of the connection is obtained from the syntactic structure information. The weights for combining vectors are obtained from weight information. This procedure is the same as that in FIG. 6A except that weight information is taken into consideration.

According to Example 2, by using dependency information in addition to structure information for vector data learning, it is possible to generate vector data that may express states and connection relationships. With a combination method with higher expressive capability, it is possible to achieve high accuracy in tasks such as classification of programs executed during processing.

What is claimed is:

1. An automatic program generation system for suppressing a combinatorial explosion of processing, the automatic program generating system comprising:
    an input/output device that receives inputs of input data, target data, and design requirements for a first program to be generated;
    a memory that stores a plurality of existing second programs;
    a processor communicatively coupled to the input/output device and the memory, wherein the processor:
    analyzes the plurality of existing second programs stored in the memory,
    generates a program model based on the analysis of the plurality of existing second programs,
    generates basic nodes and constraints for evolutionary computation based on the program model and the design requirements input from the input/output device,
    generates a plurality of individuals, a generation number, an intersection probability, a mutation probability, a selection weight according to classification information of a node, a selection probability of a node, and a mutation probability of a node as the constraints,
    generates an initial group based on the constraints,
    calculates a compatibility representing a distance between the output data of individuals with respect to the input data and the target data by using the input data and the target data,
    selects the individuals from the initial group based on the compatibility and the constraints and performs intersection processing or mutation processing on the individuals selected from the initial group by using the constraints to return corrected individuals to the initial group, selects a representative individual from the returned corrected individuals, and converts the representative individual into the first program; and the input/output device outputs the first program.

2. The automatic program generation system according to claim 1, wherein the program model is vector data in which at least one of the second program is converted, and the processor extracts syntactic structure information from the plurality of existing second programs and enumerates node items from the syntactic structure information to learn node vector information, in order to derive the vector data.

3. The automatic program generation system according to claim 1, wherein the program model is template data, and the processor extracts syntactic structure information from the plurality of existing second programs, extracts a partial structure from the syntactic structure information, and extracts a similar structure between the plurality of existing second programs, in order to derive the template data.

4. The automatic program generation system according to claim 1:

wherein the program model is a probability transition graph, and the processor creates a program list from the plurality of existing second programs and overlaps the syntactic structure information of the plurality of existing second programs according to the created program list, in order to derive the probability transition graph.

5. The automatic program generation system according to claim 1, wherein the program model is vector data in which at least one of the second program is converted, and the processor extracts syntactic structure information from the plurality of existing second programs, extracts dependency information from the plurality of existing second programs, learns node vector information by enumerating node items from the syntactic structure information, generates weight information from the dependency information, and additionally learns the node vector based on the node vector information and the weight information, in order to derive the vector data.

6. The automatic program generation system according to claim 1, wherein the input/output device inputs at least one of a type of utilization program, a type of library and style as the design requirements.

7. The automatic program generation system according to claim 1, wherein the input/output device inputs the first program before correction as the design requirements.

8. The automatic program generation system according to claim 1, wherein the program model is vector data in which at least one of the second program is converted, and the processor classifies the nodes in the plurality of existing second programs using the vector data and generates the constraints based on the classification information of the nodes.

9. The automatic program generation system according to claim 1, wherein the program model is template data or a probability transition graph, and the processor analyzes a connection relationship between the nodes in the plurality of existing second programs by using the template data or the probability transition graph and generates the constraints based on the connection relationship of the nodes.

10. The automatic program generation system according to claim 1, wherein the processor generates a basic node constituting each node of a tree structure processed for the evolutionary computation as the basic node.

11. The automatic program generation system according to claim 1, wherein the program model is vector data in which at least one of the second program is converted, and the processor classifies the nodes in the plurality of existing second programs by using the vector data and generates basic nodes for the evolutionary computation based on the classification information of the nodes.

12. The automatic program generation system according to claim 1, wherein the program model is template data, and the processor uses the template data as the basic nodes.

13. The automatic program generation system according to claim 1, wherein the evolutionary computation is genetic programming, and the processor repeatedly updates generations by the evolutionary computation according to the genetic programming and converges the compatibility to generate the first program.

14. An automatic program generation method for suppressing a combinatorial explosion of processing, the method comprising:

receiving inputs, via a processor, of input data, target data, and design requirements for a first program to be generated by the processor;

storing a plurality of existing second programs in a memory;

analyzing, via the processor, the plurality of existing second programs to generate a program model;

generating, via the processor, basic nodes and constraints for evolutionary computation based on the generated program model and the input design requirements;

generating a plurality of individuals, a generation number, an intersection probability, a mutation probability, a selection weight according to classification information of a node, a selection probability of a node, and a mutation probability of a node as the constraints;

generating, via the processor, an initial group based on the constraints;

calculating, via the processor, a compatibility representing a distance between the output data of individuals with respect to the input data and the target data by using the input data and the target data;

selecting, via the processor, the individuals from the initial group based on the compatibility and the constraints and performs intersection processing or mutation processing on the individuals selected from the initial group by using the constraints to return corrected individuals to the initial group;

selecting, via the processor, representative individual from the returned corrected individuals;

converting, via the processor, the representative individual into the first program; and outputting the generated first program.

* * * * *